US012709155B2

(12) United States Patent
Ueda

(10) Patent No.: US 12,709,155 B2
(45) Date of Patent: Aug. 18, 2026

(54) DISPLAY SYSTEM AND CONTENT DISPLAY METHOD

(71) Applicant: Sharp NEC Display Solutions, Ltd., Tokyo (JP)

(72) Inventor: Shinya Ueda, Tokyo (JP)

(73) Assignee: Sharp Display Solutions, Ltd., Tokyo (JP)

( * ) Notice: Subject to any disclaimer, the term of this patent is extended or adjusted under 35 U.S.C. 154(b) by 50 days.

(21) Appl. No.: 18/887,760

(22) Filed: Sep. 17, 2024

(65) Prior Publication Data

US 2025/0010718 A1 Jan. 9, 2025

Related U.S. Application Data

(63) Continuation of application No. PCT/JP2022/015163, filed on Mar. 28, 2022.

(51) Int. Cl.

| | |
|---|---|
| ***G06Q 30/02*** | (2023.01) |
| ***B60K 35/22*** | (2024.01) |
| ***G06F 16/9537*** | (2019.01) |
| ***G06F 16/955*** | (2019.01) |

(52) U.S. Cl.

CPC .......... *B60K 35/22* (2024.01); *G06F 16/9537* (2019.01); *G06F 16/9566* (2019.01)

(58) Field of Classification Search

CPC . B60K 35/22; G06F 16/9537; G06F 16/9566; G06Q 30/0207–30/0277; G09F 21/04

See application file for complete search history.

(56) References Cited

U.S. PATENT DOCUMENTS

| | | | | |
|---|---|---|---|---|
| 10,740,786 B2 * | 8/2020 | Buchalter | .......... | G06Q 30/0272 |
| 2012/0205436 A1 * | 8/2012 | Thomas | ............. | G06K 17/0025 235/375 |
| 2013/0124186 A1 * | 5/2013 | Donabedian | .......... | G06F 40/166 715/265 |

(Continued)

FOREIGN PATENT DOCUMENTS

| | | |
|---|---|---|
| CN | 110770783 A * | 2/2020 |
| JP | 2002-318744 A | 10/2002 |

(Continued)

OTHER PUBLICATIONS

International Search Report in PCT/JP2022/015163 dated May 31, 2022 with English translation.

*Primary Examiner* — Thuy N Nguyen

(74) *Attorney, Agent, or Firm* — McGinn IP Law Group, PLLC

(57) ABSTRACT

A display system includes a display control unit configured to display content based on a position of a vehicle along with identification information including information for identifying at least one of a time at which the content has been displayed and a position at which the content has been displayed on one or more display units on the vehicle. The display system further includes an acquisition unit configured to acquire at least one of the time at which the content has been displayed and the position at which the content has been displayed from the identification information acquired by a terminal device after the identification information displayed on the display unit has been acquired using a camera of the terminal device.

4 Claims, 16 Drawing Sheets

(56) References Cited

U.S. PATENT DOCUMENTS

| | | | | |
|---|---|---|---|---|
| 2013/0238409 | A1* | 9/2013 | Chatterjee | G06Q 30/02 348/837 |
| 2015/0058123 | A1* | 2/2015 | Lenahan | G06Q 30/0267 705/14.58 |
| 2015/0371265 | A1* | 12/2015 | Leisher | G06Q 30/0257 705/14.55 |
| 2016/0328730 | A1* | 11/2016 | Salamon | G06Q 30/0207 |
| 2019/0096297 | A1* | 3/2019 | Cary | G06Q 30/0265 |
| 2019/0121522 | A1* | 4/2019 | Davis | G06V 40/28 |
| 2020/0043052 | A1* | 2/2020 | Takemura | G01C 21/3679 |
| 2020/0143424 | A1* | 5/2020 | Otsuka | G06Q 30/0259 |
| 2021/0224842 | A1* | 7/2021 | Buchalter | G06Q 30/0246 |
| 2022/0262113 | A1* | 8/2022 | Herzberg | G06Q 30/0251 |
| 2023/0106069 | A1* | 4/2023 | Williams | G06Q 30/0265 705/14.62 |
| 2024/0233277 | A9* | 7/2024 | Konagai | G06V 20/20 |

FOREIGN PATENT DOCUMENTS

| | | | | |
|---|---|---|---|---|
| JP | 2010-117633 | A | | 5/2010 |
| JP | 2014-139758 | A | * | 7/2014 |
| JP | 6516944 | B1 | * | 5/2019 |
| JP | 2020-024514 | A | | 2/2020 |
| WO | WO 2010/025527 | A1 | | 3/2010 |

* cited by examiner

FIG. 2

| VEHICLE NUMBER | CONTENT NUMBER | CONTENT | TARGET PLACE | CONTENT TYPE | DELIVERY STATUS | SNS ACCOUNT |
|---|---|---|---|---|---|---|
| v1 | c1 | LUNCH BOX STORE A | 35.681236, 139.767125 | MOVING IMAGE | IN-DELIVERY | @bentoA |
| v1 | c1 | LUNCH BOX STORE A | 35.681236, 139.767125 | STILL IMAGE | IN-DELIVERY | @bentoA |
| v1 | c2 | LOCAL COMPANY B | 35.689607, 139.700571 | MOVING IMAGE | PRE-DELIVERY | @jimotoB |
| v1 | c2 | LOCAL COMPANY B | 35.689607, 139.700571 | STILL IMAGE | PRE-DELIVERY | @jimotoB |
| v1 | c3 | THEATER C | 35.729503, 139.7109 | MOVING IMAGE | PRE-DELIVERY | @eigaC |
| v1 | c3 | THEATER C | 35.729503, 139.7109 | STILL IMAGE | PRE-DELIVERY | @eigaC |
| v2 | c1 | LUNCH BOX STORE A | 35.681236, 139.767125 | MOVING IMAGE | IN-DELIVERY | @bentoA |
| v2 | c1 | LUNCH BOX STORE A | 35.681236, 139.767125 | STILL IMAGE | IN-DELIVERY | @bentoA |
| v2 | c4 | BAR D | 35.679607, 139.700571 | MOVING IMAGE | PRE-DELIVERY | @izkayaD |
| v2 | c4 | BAR D | 35.679607, 139.700571 | STILL IMAGE | PRE-DELIVERY | @izkayaD |
| v2 | c5 | PUBLIC OFFICE E | 35.719503, 139.7109 | MOVING IMAGE | PRE-DELIVERY | @yakushoE |
| v2 | c5 | PUBLIC OFFICE E | 35.719503, 139.7109 | STILL IMAGE | PRE-DELIVERY | @yakushoE |
| … | … | … | … | … | … | … |

FIG. 3

| ADVERTISEMENT NUMBER | VEHICLE NUMBER | TIME DATA | INCENTIVE NUMBER | ACTION FREQUENCY |
|---|---|---|---|---|
| 1 | B1 | T1 | X1124045 | 50 |
| 2 | B2 | T2 | Y1245860 | 100 |
| 3 | B3 | T3 | Z4526502 | 130 |
| ... | ... | ... | ... | ... |

FIG. 4

| CONTENT NUMBER | CONTENT | TARGET PLACE | CONTENT TYPE | DELIVERY STATUS |
|---|---|---|---|---|
| v1 | LUNCH BOX STORE A | 35.681236, 139.767125 | MOVING IMAGE | IN-DELIVERY |
| v1 | LUNCH BOX STORE A | 35.681236, 139.767125 | STILL IMAGE | IN-DELIVERY |
| v2 | LOCAL COMPANY B | 35.689607, 139.700571 | MOVING IMAGE | PRE-DELIVERY |
| v2 | LOCAL COMPANY B | 35.689607, 139.700571 | STILL IMAGE | PRE-DELIVERY |
| v3 | THEATER C | 35.729503, 139.7109 | MOVING IMAGE | PRE-DELIVERY |
| v3 | THEATER C | 35.729503, 139.7109 | STILL IMAGE | PRE-DELIVERY |
| ... | ... | ... | ... | ... |

FIG. 10

| VEHICLE NUMBER | CONTENT NUMBER | CONTENT | TARGET PLACE | DELIVERY STATUS | SNS ACCOUNT |
|---|---|---|---|---|---|
| v1 | c1 | LUNCH BOX STORE A | 35.681236, 139.767125 | IN-DELIVERY | @bentoA |
| v1 | c2 | LOCAL COMPANY B | 35.689607, 139.700571 | PRE-DELIVERY | @jimotoB |
| v1 | c3 | THEATER C | 35.729503, 139.7109 | PRE-DELIVERY | @eigaC |
| v2 | c1 | LUNCH BOX STORE A | 35.681236, 139.767125 | IN-DELIVERY | @bentoA |
| v2 | c4 | BAR D | 35.679607, 139.700571 | PRE-DELIVERY | @izkayaD |
| v2 | c5 | PUBLIC OFFICE E | 35.719503, 139.7109 | PRE-DELIVERY | @yakushoE |
| ... | ... | ... | ... | ... | ... |

FIG. 11

| ADVERTISEMENT NUMBER | VEHICLE NUMBER | TIME DATA | ACCESS FREQUENCY | INCENTIVE NUMBER | USE FREQUENCY |
|---|---|---|---|---|---|
| 1 | B1 | T1 | 100 | X1124045 | 50 |
| 2 | B2 | T2 | 240 | Y1245860 | 100 |
| 3 | B3 | T3 | 300 | Z4526502 | 130 |
| ... | ... | ... | ... | ... | ... |

| VEHICLE NUMBER | CONTENT NUMBER | CONTENT | TARGET PLACE | DELIVERY START TIME | DELIVERY STATUS |
|---|---|---|---|---|---|
| v1 | c1 | LUNCH BOX STORE A | 35.681236, 139.767125 | 2021/08/20 13:40 | WAITING |
| v1 | c2 | LOCAL COMPANY B | 35.689607, 139.700571 | 2021/08/20 14:20 | IN-DELIVERY |
| v1 | c3 | THEATER C | 35.729503, 139.7109 | - | WAITING |

FIG. 14

DISPLAY SYSTEM AND CONTENT DISPLAY METHOD

TECHNICAL FIELD

The present invention relates to a display system and a content display method.

BACKGROUND ART

Wrapping advertisement in which an advertisement printed on paper media is attached to the inside of a public transportation means such as a bus or a subway train or a special film on which an advertisement is printed or the like is attached to a vehicle body has been used. However, an advertisement using a sheet-shaped medium such as a paper medium or a film is high in costs and there is a problem in that display details of an advertisement thereon cannot vary.

Therefore, an advertisement using a digital medium such as a light emitting diode (LED) display has been recently used. With advertisement using a digital medium, it is possible to decrease costs for printing, replacement, or the like in comparison with an advertisement on a paper medium or wrapping advertisement and to allow an owner of a vehicle to easily vary display details of an advertisement.

However, with an advertisement using a digital medium, although it is possible to vary display details of the advertisement, it is preferable to ascertain to what extent an advertisement using a function of changing display details is effective.

A technique of displaying an advertisement on a display device provided in a vehicle such as a bus or a subway train is known (for example, Patent Document 1). An advertisement is displayed when a position of a vehicle arrives at a target place for advertisement delivery. That is, display details are updated such that an advertisement based on a local region is displayed.

CITATION LIST

Patent Document

[Patent Document 1]
Japanese Unexamined Patent Application, First Publication No. 2010-117633

SUMMARY OF INVENTION

Technical Problem

However, although a bus or a subway train operates on the basis of a time-table, when passengers' boarding or alighting takes time or an operation delay or the like occurs, a time at which the vehicle arrives at a target place for advertisement delivery varies, and thus a time at which the advertisement is displayed also varies. When the vehicle is a taxi, the vehicle does not operate on the basis of a time-table. Accordingly, since a time at which the vehicle arrives at a target place for advertisement delivery varies depending on a user's use situation, a time at which the advertisement is displayed also varies. An effect of content such as an advertisement or the like may change depending on a display time thereof. It is preferable to ascertain an effect of display of such content in consideration of a timing at which the content is displayed.

Solution to Problem

According to an aspect of the present invention, there is provided a display system including: a display control unit configured to display content based on a position of a vehicle along with identification information including information for identifying at least one of a time at which the content has been displayed and a position at which the content has been displayed on one or more display units on the vehicle; and an acquisition unit configured to acquire at least one of the time at which the content has been displayed and the position at which the content has been displayed from the identification information acquired by a terminal device after the identification information displayed on the display unit has been acquired using a camera of the terminal device.

According to another aspect of the present invention, there is provided a display system including: a display control unit configured to display content based on a position of a vehicle along with identification information for identifying at least one of a time at which the content has been displayed and a position at which the content has been displayed and provision information including connection destination information of the content on one or more display units on the vehicle; and an acquisition unit configured to acquire at least one of the time at which the content has been displayed and the position at which the content has been displayed based on the identification information from a terminal device having accessed an access destination indicated by the connection destination information after the provision information displayed on the display unit has been acquired using the terminal device. In some cases, the one or more display units may optionally be placed at, at least one of an inside position of an inside space of the vehicle and an outside position on an outside surface of the vehicle.

According to another aspect of the present invention, there is provided a content display method including: displaying content based on a position of a vehicle along with identification information including information for ascertaining at least one of a time at which the content has been displayed and a position at which the content has been displayed on one or more display units on the vehicle; and acquiring at least one of the time at which the content has been displayed and the position at which the content has been displayed from the identification information acquired by a terminal device after the identification information displayed on the display unit has been acquired using a camera of the terminal device.

According to another aspect of the present invention, there is provided an information collecting method including: displaying content based on a position of a vehicle along with identification information including information for identifying at least one of a time at which the content has been displayed and a position at which the content has been displayed and provision information including connection destination information of the content on one or more display units on the vehicle; and acquiring at least one of the time at which the content has been displayed and the position at which the content has been displayed based on the identification information from a terminal device having accessed an access destination indicated by the connection destination information after the provision information displayed on the display unit has been acquired using the terminal device.

Advantageous Effects of Invention

According to the present invention, it is possible to ascertain an effect of content display in consideration of a timing or a position at which content is displayed.

BRIEF DESCRIPTION OF DRAWINGS

FIG. 2 is a diagram illustrating an example of a content table that is stored in an advertisement database 11.

FIG. 3 is a measurement data table illustrating an example of measurement data that is stored in a storage unit 133.

FIG. 4 is a diagram illustrating an example of a delivery table that is stored in an advertisement database 22.

FIG. 10 is a diagram illustrating an example of a content table that is stored in an advertisement database 11*a*.

FIG. 11 is a measurement data table illustrating an example of measurement data that is stored in a storage unit 133*a*.

FIG. 14 is a flowchart illustrating a process flow that is performed by a delivery server 23*a* mounted in a vehicle Va.

DESCRIPTION OF EMBODIMENTS

Figure 1A:
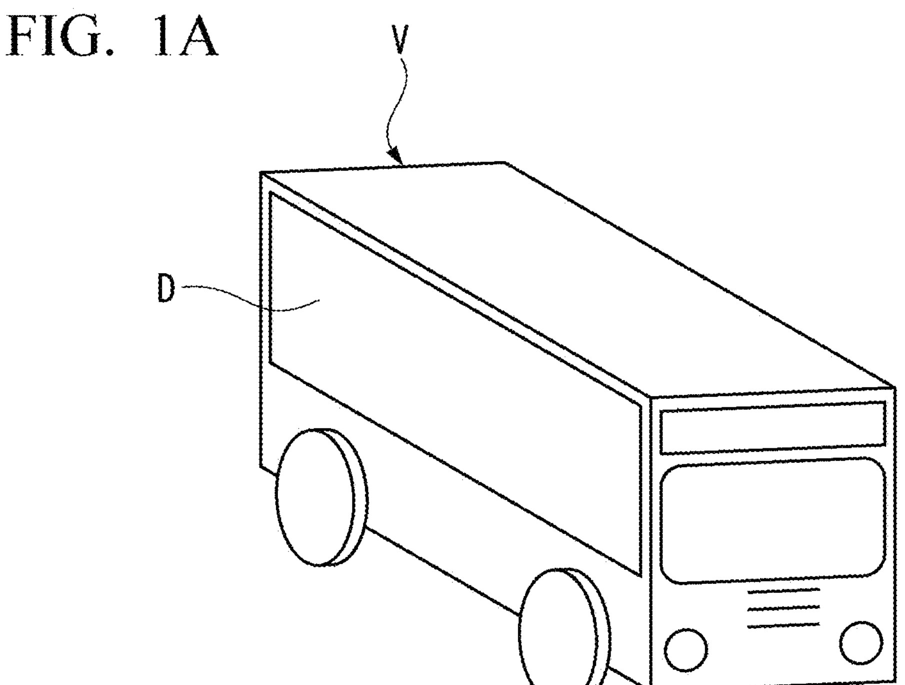
FIG. 1A is an external view illustrating an appearance of a vehicle V according to an embodiment.
Figure 1B:
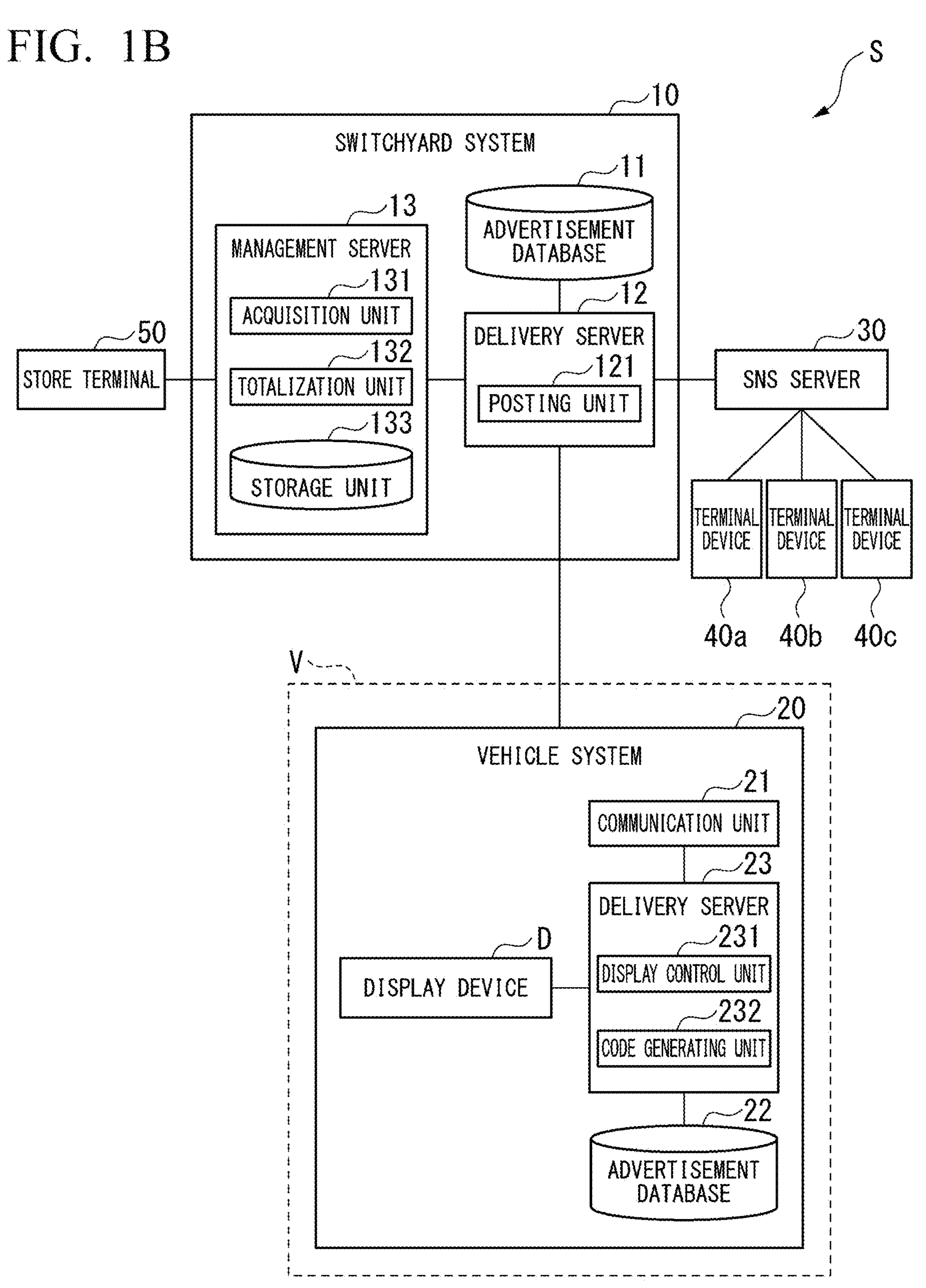
FIG. 1B is a system configuration diagram illustrating a configuration of a display system S.

FIG. 1 is an outer view illustrating an appearance of a vehicle V according to an embodiment.

A display device D is provided in the vehicle V. In the drawing, the display device D is provided on an outer surface of the vehicle such that content displayed on the display device D can be seen from the outside of the vehicle V. The display device D is provided, for example, on a right side surface of the outer surface of the vehicle V. The display device D may be provided on a left side surface or a rear surface of the vehicle V.

The vehicle V has only to allow the display device D to be attached thereto and move by traveling. In the following description, the vehicle V is assumed to be a bus, but the vehicle V may be any of a subway train, a truck, and an automobile. When the vehicle Vis a bus, the vehicle V serves as a digital wrapping bus using a digital medium. When the vehicle Vis a truck, the vehicle V serves as an advertisement truck using a digital medium.

FIG. 2 is a system configuration diagram illustrating a configuration of a display system S.

The display system S includes a switchyard system 10, a vehicle system 20, an SNS server 30, a terminal device 40 (40*a*, 40*b*, and 40*c*), and a store terminal 50.

The switchyard system 10 is used in a switchyard. The switchyard system 10 includes an advertisement database 11, a delivery server 12, and a management server 13.

The advertisement database 11 stores a content table that is acquired from an advertisement consignor (an advertiser). The advertisement database 11 is communicatively connected to the delivery server 12. Content may be any of an advertisement, news, a weather forecast, movies, animations, and the like. An example in which content is an advertisement will be described below. For example, an advertisement includes details for incentives. The incentive may be, for example, one of discount from a product price or provision of a service, offering of a present, and a coupon. When the incentive is a coupon, the content includes, for example, guide text such as "coupons available in OO store will be provided to a person having imaged this advertisement using a camera and posted the captured image on an SNS" such that it can be seen that coupons will be given to a person having imaged the content. A display area of identification information is arranged to overlap a display area of the content, and the identification information is displayed on the display device D along with the content. Accordingly, by imaging the content using a camera of the terminal device 40, the identification information can also be imaged.

Here, the identification information includes information for ascertaining content based on a position of a vehicle on the basis of at least one of arrival of the vehicle at a target place and a current time, that is, on the basis of a time at which content based on a position of the vehicle is displayed and a position at which the content is displayed.

The identification information may further include content identification information (a content number) for identifying content. In this case, the content number included in the identification information is a content number that can identify content which is displayed along with the identification information.

A type of the identification information may be a barcode, a two-dimensional barcode, a character string, an image, or a figure.

The advertisement database 11 stores a content table.

FIG. 2 is a diagram illustrating an example of a content table that is stored in the advertisement database 11. The content table includes entries such as a vehicle number, a content number, content, a target place, a content type, a delivery status, and a social networking service (SNS) account.

The vehicle number is information for identifying a vehicle.

The content number is information for identifying an advertisement.

The content is content that is displayed on a display device.

The target place indicates a target place at which display of content is started.

The content type indicates a type indicating whether the content is a still image or a moving image.

The delivery status indicates a delivery situation of content. The delivery status includes, for example, "pre-delivery" indicating that content has not yet been delivered, "in-delivery" indicating that content is being delivered, and "delivered" indicating that delivery of content has been ended.

The SNS account is an account assigned in advance to a client for content delivery (for example, an advertisement consignor). The SNS of the SNS server 30 can be used by using this account.

Referring back to FIG. 2, the delivery server 12 is communicatively connected to the advertisement database 11, the management server 13, the SNS server 30, and the vehicle system 20.

The delivery server 12 receives content data acquired along with a delivery request from an advertisement consignor from a terminal device of an advertiser and stores the received content data in the advertisement database 11.

The delivery server 12 includes a posting unit 121. When notification data transmitted from the vehicle system 20 (the delivery server 23) in response to display of content on the display device D is received, the posting unit 121 transmits posting data for notifying of a position of the vehicle on which the content is displayed to the SNS server 30 with the account corresponding to the displayed content as a transmission source and delivers the posting data such that the posting data can be viewed from a user's terminal device 40. The notification data includes a content number of the displayed content and a current position of the vehicle V when the content has been displayed and may further include a vehicle number.

The management server 13 is communicatively connected to the delivery server 12 and the store terminal 50.

The management server 13 includes an acquisition unit 131 and a totalization unit 132.

After identification information has been acquired using a camera of a terminal device of a user having viewed the content displayed on the display unit (the display device D), the acquisition unit 131 acquires at least one of a time at which the content has been displayed and a position of the vehicle when the content has been displayed from the identification information when an action using the identification information has been performed by the user.

The acquisition unit 131 acquires identification information form a terminal device of a store (the store terminal 50) when a service has been provided using the identification information. When the identification information is acquired from the store terminal 50, the acquisition unit 131 may read the identification information using a barcode reader of a POS register connected to the store terminal 50 and acquire the reading result from the store terminal 50. When the identification information is acquired from the store terminal 50, the acquisition unit 131 may image the identification information using a camera provided in the store terminal 50 (for example, a smartphone or a tablet) and acquire the identification information from the store terminal 50.

When the acquisition unit 131 acquires (receives) the identification information from the store terminal 50, it can be estimated that the content has been viewed by a user. Accordingly, it is possible to ascertain an effect of displayed content by acquiring the identification information. Since the identification information includes a time at which the content has been displayed, it is possible to ascertain at what timing the displayed content has been viewed and thus to ascertain the effect of displayed effect in consideration of the timing at which the content has been displayed.

The totalization unit 132 calculates the number of incentives issued in response to viewing of the content, the number of pieces of identification information acquired from a store terminal or a web site in response to use of incentives, and a ratio therebetween.

Whether content has been viewed can be ascertained by receiving the identification information from the store terminal 50.

Use of an incentive may be use of an incentive in a store or viewing a specific web site using the incentive. In the use of an incentive, a screen on which an issuance button for requesting issuance of a coupon using the incentive is displayed may be accessed using the terminal device 40, and a coupon may be displayed in an available state on the terminal device 40 at a timing at which the issuance button has been pushed by a user. Accordingly, the user can use the coupon at a desired timing.

The storage unit 133 stores a measurement data table based on acquisition results from the acquisition unit 131*a*.

FIG. 3 is a measurement data table illustrating an example of measurement data stored in the storage unit 133.

The measurement data table includes entries of an advertisement number, a vehicle number, time data, an incentive number, and an action frequency.

The time data is time data that is acquired from identification information included in a screen of content imaged by the terminal device 40. Regarding the time data, a time indicating identification information may be described as a character string in content, and the totalization unit 132 may acquire the time and write the time to the storage unit 133 by allowing a clerk to input the character string via the store terminal 50. When the identification information in content is indicated by a machine-readable code, the identification information may be transmitted from the store terminal 50 to the management server 13 by reading the machine-readable code using a barcode reader of a POS register connected to the store terminal 50, and the acquisition unit 131 may receive and write the identification information to the storage unit 133. When the time data is written to the storage unit 133, it is possible to ascertain an effect of display of the content in consideration of the time at which the content is displayed.

The incentive number is information for identifying a type of an issued incentive.

The action frequency indicates the number of times an action using identification has been performed by a user. The action using identification information may be, for example, an action of presenting an image obtained by imaging content including identification information in a store in which an incentive is available, retweet of content including identification information over an SNS, or sharing of content including identification information over an SNS.

In the measurement data table, entries such as the advertisement number, the vehicle number, and the incentive number are stored in advance to correspond to the content table with storage of the content table in the advertisement database 11. The time data is written on the basis of time data transmitted from the store terminal 50 after the management server 13 has been activated. As the use frequency, the number of times identification information is transmitted from the store terminal 50 to the management server 13 is counted for each advertisement number and for each vehicle number, and a count result thereof is written.

The vehicle system 20 includes a communication unit 21, an advertisement database 22, a display device D, and a delivery server 23. The vehicle system 20 is mounted in the vehicle V.

The communication unit 21 is connected to the delivery server 12 of the switchyard system 10 via a communication line and communicates with the delivery server 12. A wireless communication line is used as the communication line.

The advertisement database 22 stores a delivery table.

FIG. 4 is a diagram illustrating an example of a delivery table that is stored in the advertisement database 22. The delivery table includes entries such as a content number, content, a target place, and a delivery status. The advertisement database 22 stores at least some data included in the content table stored in the advertisement database 11.

In the delivery table illustrated in FIG. 4, the content number, the content, the target place, the content type, and the delivery status in data correlated with the vehicle number "1" in the content table illustrated in FIG. 2 are stored.

Referring back to FIG. 2, the display device D is attached to an outer surface of the vehicle V. The display device D may be one of a liquid crystal display device and a light emitting diode (LED) display. The display device D is connected to the delivery server 23 via an image cable.

The delivery server 23 is communicatively connected to the communication unit 21 and the advertisement database 22 and is connected to the display device D via an image cable.

The delivery server 23 stores a vehicle number allocated to the vehicle V in which the delivery server 23 is mounted in advance. The delivery server 23 receives content data corresponding to the vehicle number allocated to the vehicle V in which the delivery server 23 is mounted in the content table stored in the advertisement database 11 from the delivery server 12 via the communication unit 21 and stores the received content data in the advertisement database 22.

The delivery server 23 acquires position data obtained by measuring a current position of the vehicle V in which the delivery server 23 is mounted from a positioning device. The acquisition timing may be whenever an arbitrary time interval elapses. The positioning device may employ, for example, a global navigation satellite system (GNSS) mounted in the vehicle V. The delivery server 23 determines whether the acquired current position corresponds to a target place in the delivery table stored in the advertisement database 22, and reads content of an advertisement number correlated with the target place and outputs the read content along with the identification information to the display device D when the current position is determined to correspond to the target place. When the content is read, the delivery server 23 reads content of which a content type is a moving image when the vehicle V stops and read content of which a content type is a still image when the vehicle Vis traveling.

When the content is read, the delivery server 23 transmits notification data including the content number of the read content and the current position determined to correspond to the target place to the delivery server 12 via the communication unit 21 on the basis of the vehicle number which is stored in advance. The notification data may include the vehicle number.

The delivery server 23 includes a display control unit 231 and a code generating unit 232.

The display control unit 231 causes the display device D to display the content and the identification by reading the content stored in the advertisement database 22 and outputting the read content along with identification information to the display device D.

The display control unit 231 displays content based on the position of the vehicle on one or more display units on the vehicle along with identification information including information for identifying at least one of a time at which the content has been displayed and a position at which the content has been displayed.

The display control unit 231 displays a machine-readable code generated by the code generating unit 232 along with the content on the display device D.

The code generating unit 232 generates a machine-readable code indicating identification at the time of displaying of the content. More specifically, the code generating unit 232 generates time data indicating a current time at a time point at which the content has been displayed on the basis of a timer provided in the delivery server 23 and generates a machine-readable code indicating the time data.

The machine-readable code may be a barcode or a two-dimensional barcode.

The SNS server 30 is communicatively connected to a plurality of terminal devices 40 (40*a*, 40*b*, and 40*c*) and an analysis server. The SNS server 30 has a function of receiving posting data posted from a registered account and delivering the posting data to the terminal device 40 and a function of receiving posting data posted in the form of a response to posting data in the registered account from the terminal device 40.

The SNS server 30 delivers posting data received from any terminal device 40 to other terminal devices 40 other than a transmission source of the posting data. The posting data includes at least one of text data and image data. The image data is data of a photograph captured by a camera.

The terminal device 40*a*, the termination device 40*b*, and the terminal device 40*c* are communicatively connected to the SNS server 30, for example, via a wireless communication line.

Each of the terminal device 40*a*, the termination device 40*b*, and the terminal device 40*c* is a terminal device which is used by a user and may be, for example, one of a smartphone and a tablet. Here, the terminal device 40*a*, the termination device 40*b*, and the terminal device 40*c* are illustrated as the terminal devices, but the number of terminal devices may be four or more. The terminal device 40*a*, the termination device 40*b*, and the terminal device 40*c* may be simply referred to as a "terminal device 40" unless they are particularly distinguished.

The terminal device 40 has a function of receiving posting data input from a user via an input device such as a touch panel and transmitting the posting data to the SNS server 30. The posting data transmitted to the SNS server 30 is stored in the SNS server 30.

The terminal device 40 has a function of receiving and outputting posting data transmitted from the SNS server 30 and posted by another terminal device 40. The terminal device 40 may display posting data on a display screen of the terminal device 40 or output the posting data from a speaker of the terminal device 40 by vocal sound. The terminal device 40 has a camera function and generates image data based on a photograph captured by the camera. Here, as a target to be imaged, a user who is outside of the vehicle V and who is not in the vehicle V images content to include identification information on a display screen displayed on the display device D using the camera function of the terminal device 40. By capturing an image in this way, the terminal device 40 can acquire the identification information displayed along with the content. Here, content and identification information are acquired by the terminal device 40 of a user who is not in the vehicle.

The terminal device 40 can transmit image data as posting data to the SNS server 30. The management server 13 determines whether an action such as a reaction (such as retweet or sharing of a message) of adding image data has been performed in response to posting data for prompting content to be imaged in an account of an advertisement consignor by the terminal device 40. This reaction can be determined by receiving and analyzing history data indicating that retweet or sharing of a message has been performed on posting data in an account of an advertisement consignor over the SNS.

Here, the management server 13 can acquire time data in which content has been displayed by analyzing identification information included in the image data used for the reaction and store time data in the storage unit 133 on the basis of the analysis result.

When such a reaction has been performed, the management server 13 determines whether an added image corresponds to the content and grants an incentive to the terminal device 40 of the user who has performed the reaction by transmitting the incentive to the terminal device 40 when the added image corresponds to the content. It is possible to ascertain an effect of displaying of content on the basis of the history in which the incentive has been granted. In determination of whether the added image corresponds to the content, when the time data indicated by the identification information included in the added image and an imaging time added to the received image data correspond to each other (when both are in a predetermined time range), the management server 13 issues an incentive. When a target place at which the added image has been displayed and an imaging place added to the received image data correspond to each other (when both are in a predetermined distance range), the management server 13 may issue an incentive. It is possible to identify whether the user has imaged the content using the terminal device 40 or whether data of an image posted over the SNS or the like by another user has been copied by using the time data or data of the imaging place (for example, exchangeable image file format (Exif) information) and to grant an incentive when the user has imaged the content using the terminal device 40. When image data posted over the SNS or the like is published over the SNS, data indicating data indicating an imaging time or an imaging place is deleted therefrom, and thus no incentive is granted even when an image is simply copied over the SNS and a reaction is performed thereon.

The store terminal 50 is communicatively connected to the management server 13 of the switchyard system 10. The store terminal 50 may be a point of sales (POS) terminal or may be a smartphone or a tablet. The store terminal 50 may be a computer connected to the POS terminal. The store terminal 50 acquires identification information when an action based on the identification information has been performed by a user. An action based on the identification information is an action of purchasing a product or receiving a service when the identification information is presented by the user. The user images content displayed on the display device D along with identification information, visits a stored indicated by the content, and presents the image captured to a clerk of the store when a product is purchased or a service is received. The clerk reads the presented identification information using a reading device (for example, a barcode reader) connected to the store terminal 50. The store terminal 50 acquires the identification information read using the reading device and transmits the acquired identification information to the management server 13. When the identification information is a barcode or a two-dimensional barcode, the identification information can be acquired by reading the identification information using the reading device. When the identification information is a character string, the store terminal 50 may acquire the identification information by optically reading the character string and performing character recognition thereon or may be acquired by allowing a clerk to input the character string using ten keys or a keyboard.

Operations of the display system S will be described below.

Figure 5:
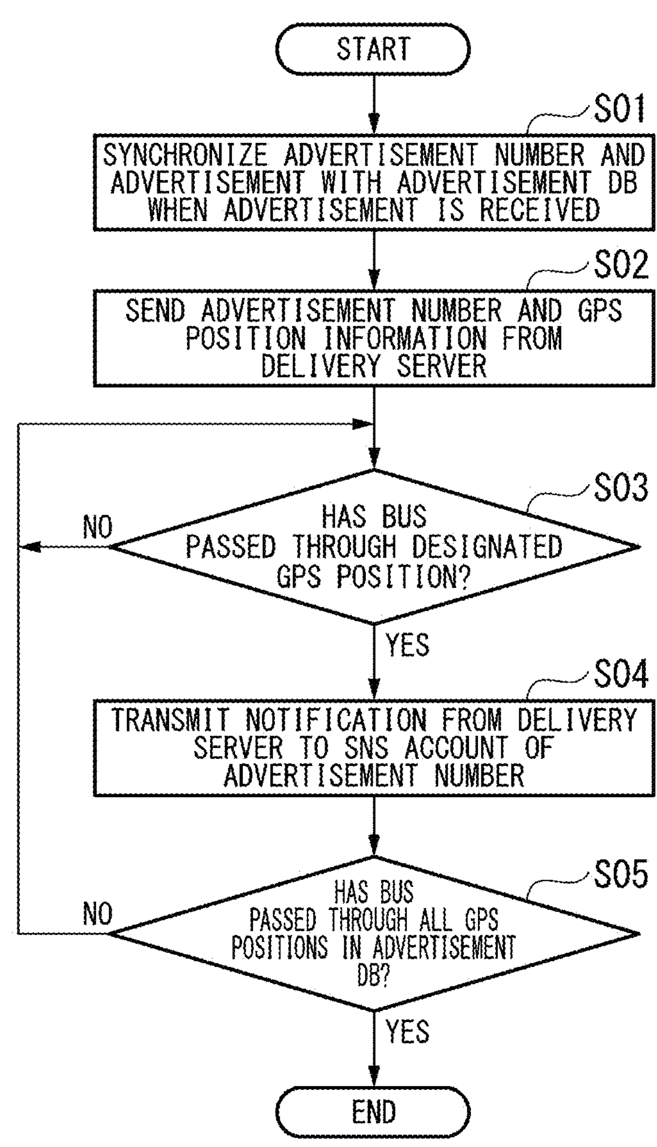
FIG. 5 is a flowchart illustrating a process flow that is performed by a delivery server 12 in a switchyard.

FIG. 5 is a flowchart illustrating a process flow that is performed by the delivery server 12 in a switchyard.

Here, a contract is signed in advance between an advertisement consignor and a vehicle operator (a bus operator herein), and a schedule for content delivery can be determined on the basis of the contract.

(Step S01)

The vehicle operator acquires a content table from the advertisement consignor. More specifically, the delivery server 12 of the switchyard system 10 receives a content table from a terminal device of the advertisement consignor and writes the content table to the advertisement database 11. For example, the content table illustrated in FIG. 2 is stored by consignment for content delivery from a plurality of advertisement consignors.

(Step S02)

When the vehicle V arrives at a switchyard and stops, the delivery server 23 notifies the switchyard system 10 of a vehicle number via the communication unit 21. The delivery server 12 transmits a content number, content, a target place, a content type, a delivery status, and an SNS account corresponding to the vehicle number to the delivery server 23 on the basis of the vehicle number received from the delivery server 23*a*.

(Step S03)

The delivery server 12 determines whether notification data transmitted when the vehicle V has added a target place has been received from the delivery server 23. When notification data has not been received, the delivery server 12 determines whether notification data has been received again after a predetermined waiting time has elapsed. On the other hand, when notification data has been received, the delivery server 12 causes the process flow to proceed to Step S04.

(Step S04)

When notification data has been received, the posting unit 121 of the delivery server 12 reads an SNS account corresponding to the content number included in the notification data from the content table and transmits posting data indicating that the vehicle V has passed through the target place to the SNS server 30 with the read SNS account as a posting source. Accordingly, the SNS server 30 publishes the posting data in the SNS site such that the posting data can be viewed by the terminal device 40. When the posting data is received from the SNS server 30, the terminal device 40 displays the posting data on a screen.

Figure 7:
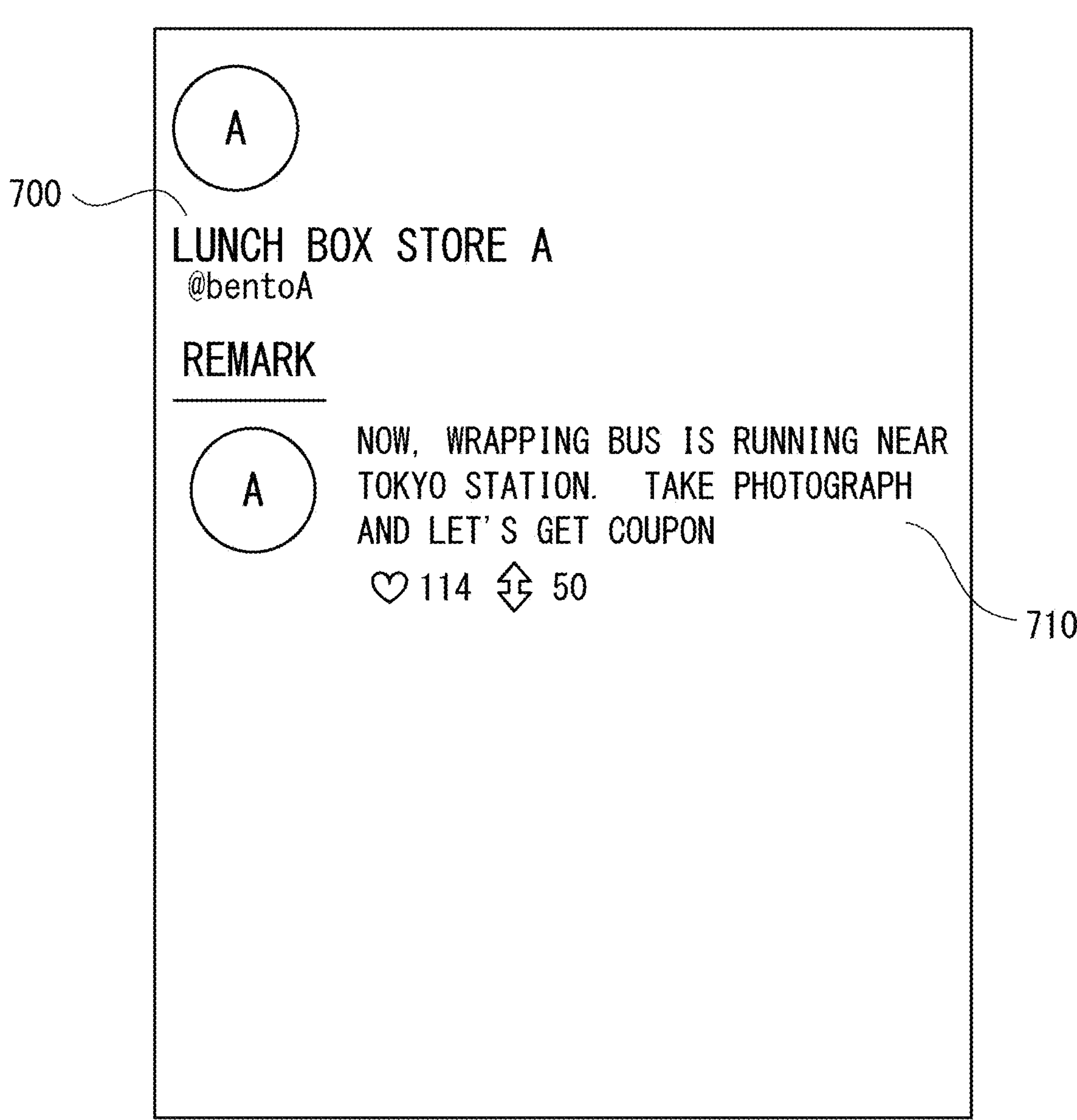
FIG. 7 is a diagram illustrating a screen example when posting data is displayed on a display screen of a terminal device 40.

FIG. 7 is a diagram illustrating a screen example when posting data is displayed on a display screen of the terminal device 40. On the display screen of posting data, a name of the SNS account and an icon are displayed (reference sign 700), and a character string indicating details of the posting data is displayed (reference sign 710). As details of the posting data, for example, a character string "Now, a wrapping bus is traveling near the Tokyo station. Let's get a coupon by taking a photograph" is displayed. When the posting data is published, a user of the terminal device 40 can ascertain whether the vehicle V is traveling near the user by viewing the posting data. Then, when the vehicle V is found, the user can image the content along with identification information using the terminal device 40.

When the notification data has been received, the delivery server 12 changes the delivery status corresponding to the content number included in the notification data from "pre-delivery" to "in-delivery." Here, when there is other content of which a delivery status of content is "in-delivery," "in-delivery" is changed to "delivered," and the delivery status of the content to be currently displayed is changed from "pre-delivery" to "in-delivery." For example, when the vehicle V passes through a target place of a content number "c1," content of "lunch box store A" is displayed. When the vehicle V passes through a target place of a content number "c2," a delivery status of content "lunch box store A" which is other content is changed from "in-delivery" to "delivered," and a delivery status of content "local company B" with the content number "c2" displayed in this time is changed from "pre-delivery" to "in-delivery." Here, since the same content includes content types of "moving image" and "still image," the delivery status may be changed to one of "pre-delivery," "in-delivery," and "delivered" on the basis of a traveling state indicating whether the vehicle V stops or not. When the same content include content types of "moving image" and "still image," it may be possible to identify the content and to identify which of "moving image" and "still image" the content type is by adding a number for identifying which of "moving image" and "still image" the content type is as a branch number or the like. In this case, the identification information may include a content number for identifying which of "moving image" and "still image" as well as identifying content.

(Step S05)

The delivery server 12 determines whether the vehicle V has passed through all of a plurality of target places correlated with the vehicle number of the vehicle, continues to perform a monitoring process in Step S03 when a target place not passed through remains (Step S07: NO), and ends the monitoring process for the vehicle V when all the target places have been passed through (Step S07: YES). For example, the delivery server 12 determines whether all of three target places of the target place of content c1, the target place of content c2, and the target place of content c3 have been passed through. The delivery server 12 continues to perform the monitoring process in Step S03 when it is determined a target place not passed through remains and ends the monitoring process when it is determined that all three target places have been passed through.

Figure 6:
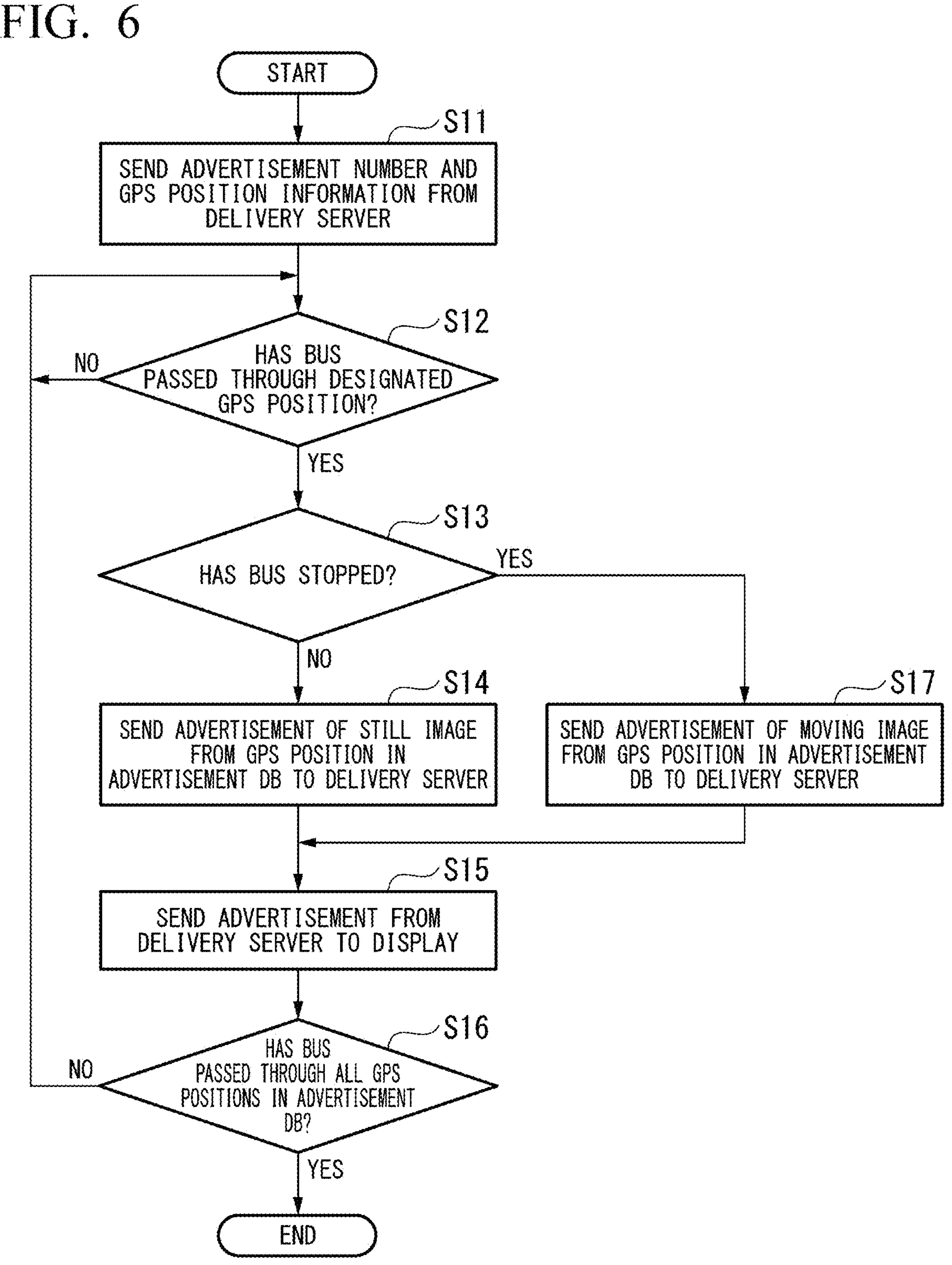
FIG. 6 is a flowchart illustrating a process flow that is performed by a delivery server 23 mounted in a vehicle V.

FIG. 6 is a flowchart illustrating a process flow that is performed by the delivery server 23 mounted in the vehicle V.

(Step S11)

When the vehicle V arrives at a switchyard and stops, the delivery server 23 notifies the delivery server 12 of a vehicle number. The delivery server 23 receives a content number, content, a target place, and a content type corresponding to the vehicle number from the delivery server 23.

(Step S12)

The delivery server 23 acquires a current position of the vehicle V from a positioning device of the vehicle V whenever a predetermined time interval elapses and determines whether the current position has reached a target place. In determination of whether the current position has reached the target place, it may be determined whether the current position and the target place match or it may be determined whether the current position is within a predetermined range from the target place.

When it is determined that the current position and the target place match (or when it is determined that the current position is within a predetermined range from the target place), the delivery server 23 causes the process flow to proceed to Step S13 (Step S12: YES). On the other hand, when it is determined that the current position and the target place do not match (or when it is determined that the current position is not within a predetermined range from the target place), the delivery server 23 causes the process flow to proceed to Step S12 after a predetermined waiting time elapses (Step S12: NO).

(Step S13)

The delivery server 23 determines whether the vehicle V stops. The delivery server 23 causes the process flow to proceed to Step S14 when the vehicle V does not stop (when the vehicle Vis traveling) (Step S13: NO) and causes the process flow to proceed to Step S17 when the vehicle V stops (Step S13: YES). This determination of whether the vehicle V stops may be performed by acquiring a control signal indicating whether the vehicle V stops or is traveling from an electronic control unit (ECU) of the vehicle V and analyzing the control signal.

(Step S14)

When the vehicle does not stop (when the vehicle is traveling), the delivery server 23 reads content stored in the advertisement database 22, which is content of a still image corresponding to a target place matching (or being within a predetermined range from) the current position, from the advertisement database 22 and causes the process flow to proceed to Step S15.

(Step S15)

When content is read, the delivery server 23 generates identification information based on the current time using the code generating unit 232. Then, the display control unit 231 of the delivery server 23 outputs the identification information along with the read content to the display device D via an image cable. Accordingly, the display device D displays the identification information along with the content on the display screen.

When the vehicle V does not stop (when the vehicle is traveling), content of a still image is displayed on the display device D. In this case, since the content is a still image even when a user outside of the vehicle images the moving image V and the content is also a still image even when the vehicle V is traveling, it is possible to prevent the content from appearing blurred when the content is imaged by the terminal device 40.

When the vehicle V stops, content of a moving image is displayed on the display device D. In this case, for a user outside of the vehicle, since the vehicle V stops, the position of the display device D does not also move when the content is a moving image. Accordingly, it is possible to prevent the content from appearing blurred when the content of a moving image is imaged by the terminal device 40.

A user outside of the vehicle V (a user who is not in the vehicle) images the content displayed on the display device D along with the identification information. For example, the identification information along with a character string such as "0% will be discounted from a total amount of money if you images the whole display screen and presents the captured image to a register at the time of payment of store 00." is displayed in the content. The user can image the content to include the identification information by imaging the whole display screen and use an incentive included in the content in a target store on the basis of a notice included in the content. In the store, a clerk receives a discounted amount of money from the user by subtracting a discount amount of money from the total amount of money with reference to a screen of content presented by a user at the time of payment. Here, when the identification information is presented by a machine-readable code such as a barcode on the captured image, the identification information is read by a barcode reader of a POS register. Accordingly, the identification information is transmitted from the store terminal 50 to the management server 13, and the identification information can be acquired by the management server 13. Here, by adding a content number and a vehicle number to the machine-readable code, the identification information along with the content number and the vehicle number is transmitted from the store terminal 50 to the management server 13. Accordingly, the management server 13 can store the content number, the vehicle number, and the identification information.

An example in which an image obtained by imaging content including identification information is presented to a clerk by a user has been described above. With this presentation of an image, it is possible to determine that an action using identification has been performed by the user and to acquire the identification information.

Accordingly, since an effect of displaying of the content can be ascertained on the basis of the time at which the content has been displayed, it is possible to estimate an effect of displaying of the content in consideration of the time at which the content has been displayed.

(Step S16)

The delivery server 23 determines whether the vehicle has passed through all of a plurality of target places stored in the advertisement database 22, continues to perform the monitoring process in Step S12 when a target place not passed through remains (Step S16: NO), and ends the monitoring process for the vehicle V when all the target places have been passed through (Step S16: YES). For example, the delivery server 23 determines whether all of three target places including the target place of content c1, the target place of content c2, and the target place of content c3 have been passed through. The delivery server 23 continues to perform the monitoring process in Step S12 when it is determined a target place not passed through remains and ends the monitoring process when it is determined that all the three target places have been passed through.

(Step S17)

When the vehicle stops, the delivery server 23 reads content stored in the advertisement database 22 which is content of a moving image corresponding to the target place corresponding to (or within a predetermined range from) the current position from the advertisement database 22 and causes the process flow to proceed to Step S15.

According to the first embodiment, since a notification indicating that an incentive has been used is transmitted from the store terminal 50, it is possible to ascertain an effect of displaying of the content in consideration of a timing at which the content has been displayed by acquiring the notification.

A display system Sa according to a second embodiment will be described below.

In the second embodiment, description of the same elements as in the first embodiment will be omitted and difference therefrom will be mainly described.

In this embodiment, content displayed on a display device Da of a vehicle Va along with identification information is imaged using a camera function of the terminal device 40. In a method of measuring an advertisement effect of an electronic advertisement displayed on the display device Da in the vehicle Va, an effect of the content can be measured by issuing an incentive (for example, a coupon) using a machine-readable code displayed in the advertisement. It is also possible to measure an effect of content on the basis of a use situation of the issued incentive.

Figure 8:
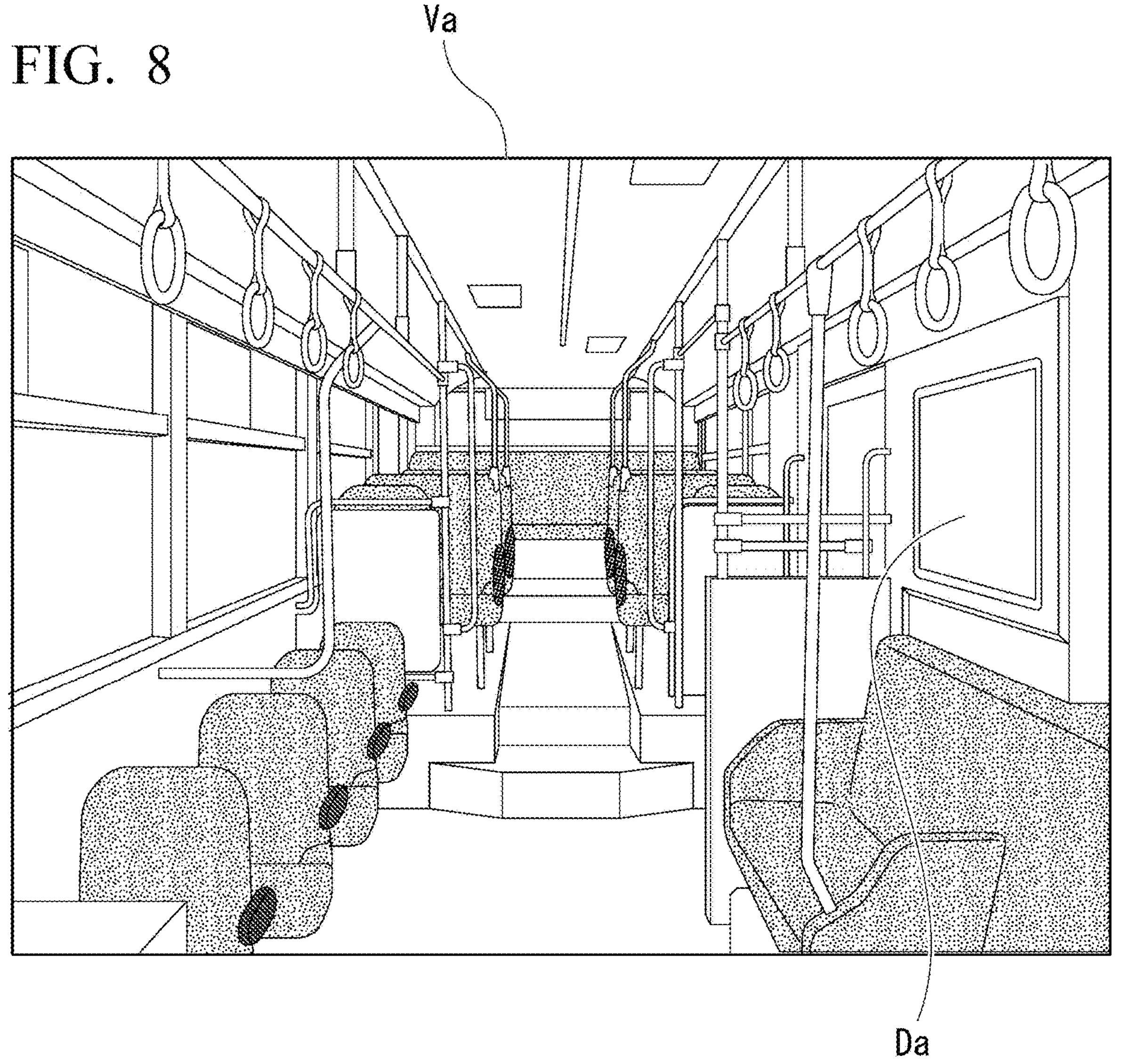
FIG. 8 is an interior view when the inside of a vehicle Va is seen.

FIG. 8 is an inner view when the inside of the vehicle Va is seen.

The display device Da is provided on an inner surface of the vehicle Va. The display device Da is provided in the vehicle Va such that content can be seen by a user in the vehicle Va. One display device Da is provided in the vehicle Va, but a plurality of display devices may be provided.

Figure 9:
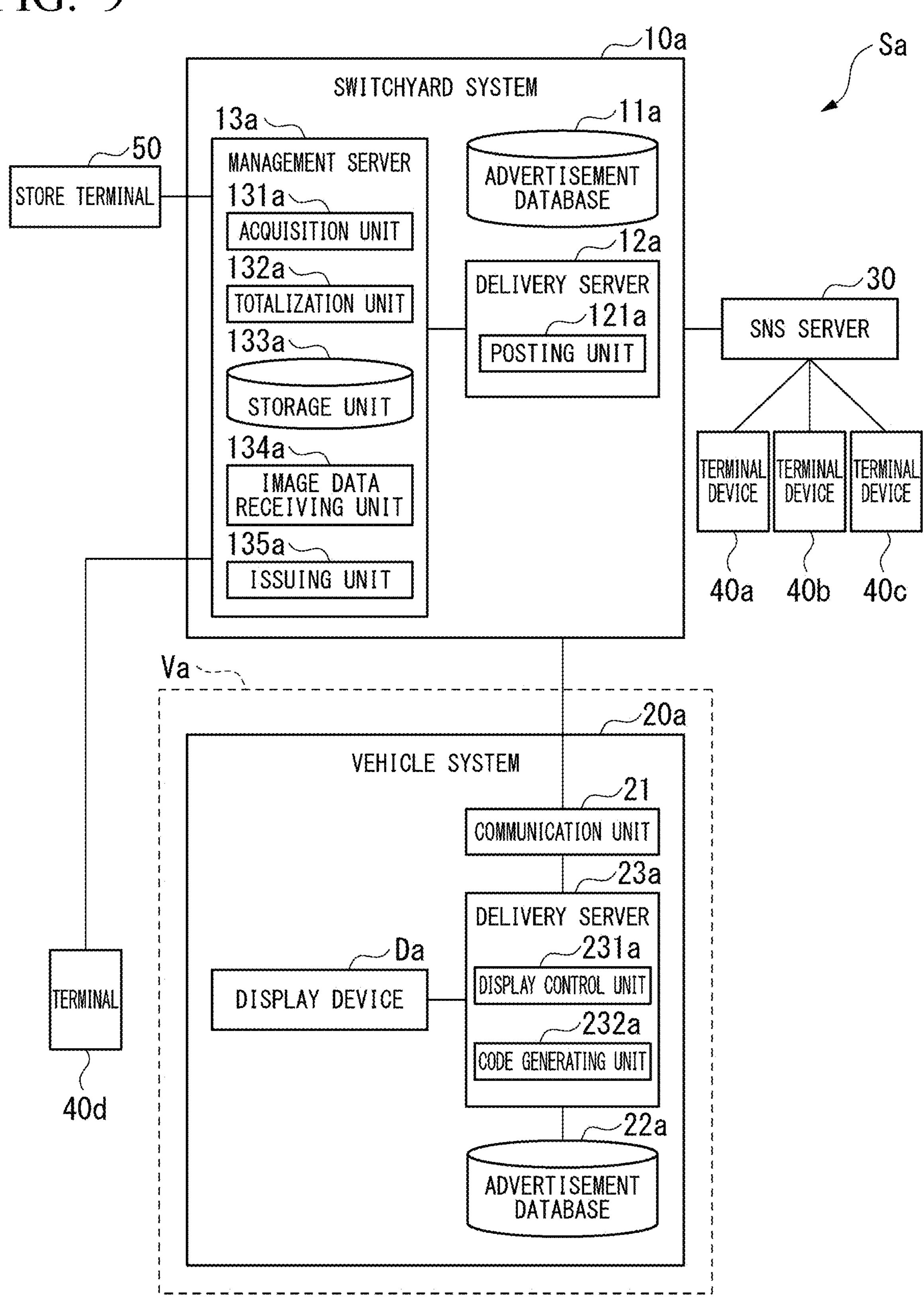
FIG. 9 is a system configuration diagram illustrating a configuration of a display system Sa.

FIG. 9 is a system configuration diagram illustrating a configuration of the display system Sa.

The display system Sa includes a switchyard system 10*a*, a vehicle system 20*a*, an SNS server 30, a terminal device 40 (40*a*, 40*b*, 40*c*, and 40*d*), and a store terminal 50. Here, three terminal devices 40 are illustrated in FIG. 2, but four terminal device 40 additionally including the terminal device 40*d* are illustrated in FIG. 9.

The switchyard system 10*a* includes an advertisement database 11*a*, a delivery server 12*a*, and a management server 13*a*.

The advertisement database 11*a* stores a content table that is acquired from an advertisement consignor (an advertiser). The advertisement database 11*a* is communicatively connected to the delivery server 12*a*.

FIG. 10 is a diagram illustrating an example of a content table that is stored in the advertisement database 11*a*. The content table includes entries such as a vehicle number, a content number, content, a target place, a delivery status, and an SNS account. In the advertisement database 11 illustrated in FIG. 2, there is an entry of a content type, and there are content of a moving image and content of a still image. However, in this embodiment, the content type may not be divisionally treated as a moving image and a still image. Since a user is in the vehicle Va, the position of the display device Da does not change greatly when seen by the user, and thus it is possible to prevent content from appearing blurred even when the content is a moving image and a still image.

The management server 13*a* includes an acquisition unit 131*a*, a totalization unit 132*a*, a storage unit 133*a*, an image data receiving unit 1344*a*, and an issuing unit 135*a*.

The acquisition unit 131*a* acquires at least one of time data and position data from the terminal device when an URL based on identification information has been accessed by a user's terminal device.

When the terminal device 40 accesses the management server 13*a*, at least one of time data and position data is added to a character string indicating an URL. For example, at least one of a character string indicating time data and a character string indicating position data is connected as a specific character string to a rear end of a character string indicating an access destination of the management server 13*a* in the character string indicating an URL. The acquisition unit 131*a* can detect the specific character string and extract at least one of the time data and the position data from the character string at the rear end of the specific character string. Accordingly, the acquisition unit 131*a* can acquire at least one of the time data and the position data with an access using the URL.

The identification information may additionally include a content number for identifying content. The content number may be added as a specific character string to the rear end of the URL, and the content number may be identified from the URL when the URL varies according to the content number.

When the identification information includes the content number, the acquisition unit may acquire the content number in addition to the time data and the position data.

The storage unit 133*a* stores measurement data based on acquisition results from the acquisition unit 131*a*.

FIG. 11 is a measurement data table illustrating an example of measurement data stored in the storage unit 133*a*.

The measurement data table includes entries of an advertisement number, a vehicle number, time data, an access frequency, an incentive number, and a use frequency.

The time data is time data based on identification information extracted from an URL accessed by the terminal device 40.

The access frequency indicates the number of times an URL corresponding to the advertisement number, the vehicle number, and the incentive number extracted from the URL accessed by the terminal device 40 has been accessed.

The incentive number is information for identifying a type of an issued incentive.

The use frequency indicates the number of times the issued incentive has been used.

In the measurement data table, the entries such as the advertisement number, the vehicle number, and the incentive number are stored in advance to correspond to the content table with storage of the content table in the advertisement database 11. The use frequency, the time data, and the access frequency are written according to an access situation to the URL after the management server 13*a* has been activated.

The image data receiving unit 134*a* receives image data to which a place and a time at which the displayed content has been imaged by an imaging unit of a user's terminal device 40 is added. Here, when image data is generated through imaging using the terminal device 40, information of an imaging time at which the imaging has been performed and an imaging place indicating a result of positioning of the current position of the terminal device 40 at the time of imaging can be added to the image data. The imaging time and the imaging place can be added, for example, as exchangeable image file format (Exif) information to the image data.

The issuing unit 135*a* issues a service ticket which is available in a store when the time data indicated by the identification information acquired by the acquisition unit 131*a* and the imaging time added to the received image data correspond to each other.

In the vehicle system 20*a*, the advertisement database 22*a* stores a delivery table.

Figures 12, 13:
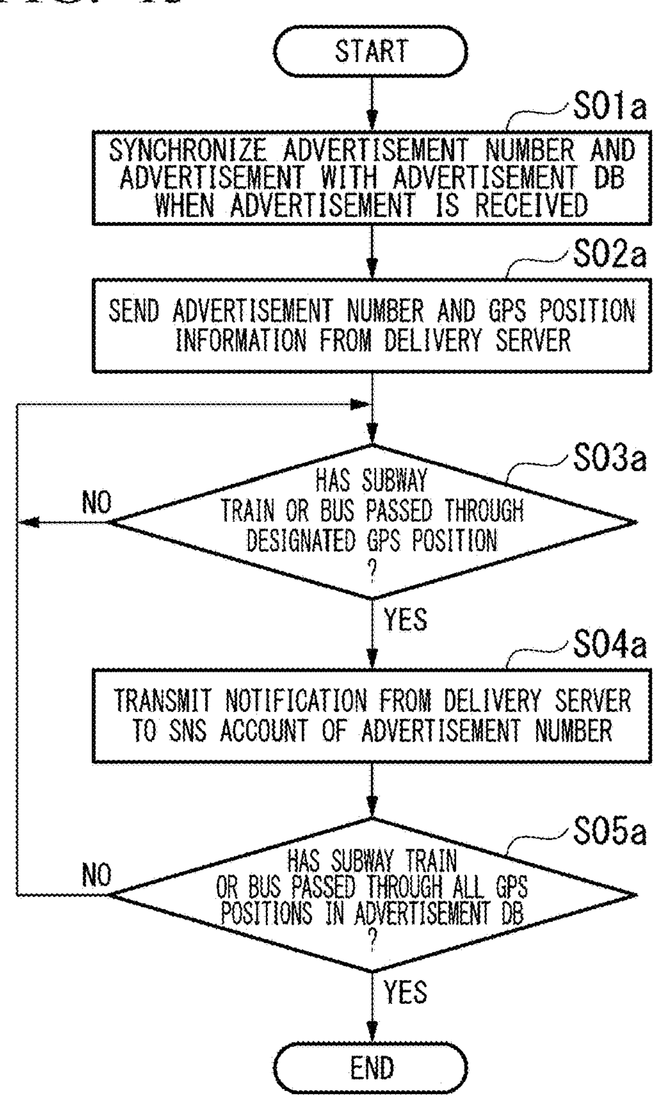
FIG. 12 is a diagram illustrating an example of a delivery table that is stored in an advertisement database 22*a*.
FIG. 13 is a flowchart illustrating a process flow that is performed by a delivery server 12*a* in a switchyard.

FIG. 12 is a diagram illustrating an example of a delivery table that is stored in the advertisement database 22*a*. The delivery table includes entries such as a vehicle number, a content number, content, a target place, a delivery start time, and a delivery status. The advertisement database 22 stores the vehicle number, the content number, the content, and the target place on the basis of data included in the content table stored in the advertisement database 11. A time at which the delivery server 23 has displayed the content is written as the delivery start time. A status corresponding to a situation in which the delivery server 23 has displayed the content is written as the delivery status.

The display device Da is connected to the delivery server 23*a* via an image cable.

The delivery server 23*a* includes a display control unit 231*a* and a code generating unit 232*a*.

When the vehicle arrives at a target place, the display control unit 231*a* displays content based on the target place on a display unit (the display device Da) provided in the vehicle along with identification information including information for identifying the time at which the content has been displayed.

The code generating unit 232*a* generates data in which time data is added to an URL as identification information. The URL is connection destination information for accessing the management server 13*a*.

The terminal device 40 images the content and the identification information displayed on the display device Da using a camera function provided in the terminal device 40 by a user in the vehicle Va. Accordingly, the identification information displayed along with the content is acquired by the terminal device 40 of the user in the vehicle Va.

FIG. 13 is a flowchart illustrating a process flow that is performed by the delivery server 12*a* in a switchyard.

Here, a contract is signed in advance between an advertisement consignor and a vehicle operator (a bus operator herein), and a schedule for content delivery can be determined on the basis of the contract.

(Step S01*a*)

The vehicle operator acquires a content table from the advertisement consignor. More specifically, the delivery server 12*a* of the switchyard system 10*a* receives a content table from a terminal device of the advertisement consignor and writes the content table to the advertisement database 11*a*. For example, the content table illustrated in FIG. 10 is stored by consignment for content delivery from a plurality of advertisement consignors.

(Step S02*a*)

When the vehicle Va arrives at a switchyard and stops, the delivery server 23*a* notifies the switchyard system 10*a* of a vehicle number via the communication unit 21*a*. The delivery server 12*a* transmits a content number, content, a target place, a content type, a delivery status, and an SNS account corresponding to the vehicle number to the delivery server 23 on the basis of the vehicle number received from the delivery server 23.

(Step S03*a*)

The delivery server 12*a* determines whether notification data transmitted when the vehicle V has added a target place has been received from the delivery server 23*a*. When notification data has not been received, the delivery server 12*a* determines whether notification data has been received again after a predetermined waiting time has elapsed. On the other hand, when notification data has been received, the delivery server 12*a* causes the process flow to proceed to Step S04*a*.

(Step S04*a*)

When notification data has been received, the posting unit 121*a* of the delivery server 12*a* reads an SNS account corresponding to the content number included in the notification data from the content table and transmits posting data indicating that the vehicle Va has passed through the target place to the SNS server 30 with the read SNS account as a posting source. Accordingly, the SNS server 30 publishes the posting data in the SNS site such that the posting data can be viewed by the terminal device 40. When the posting data is received from the SNS server 30, the terminal device 40 displays the posting data on a screen.

Figure 16:
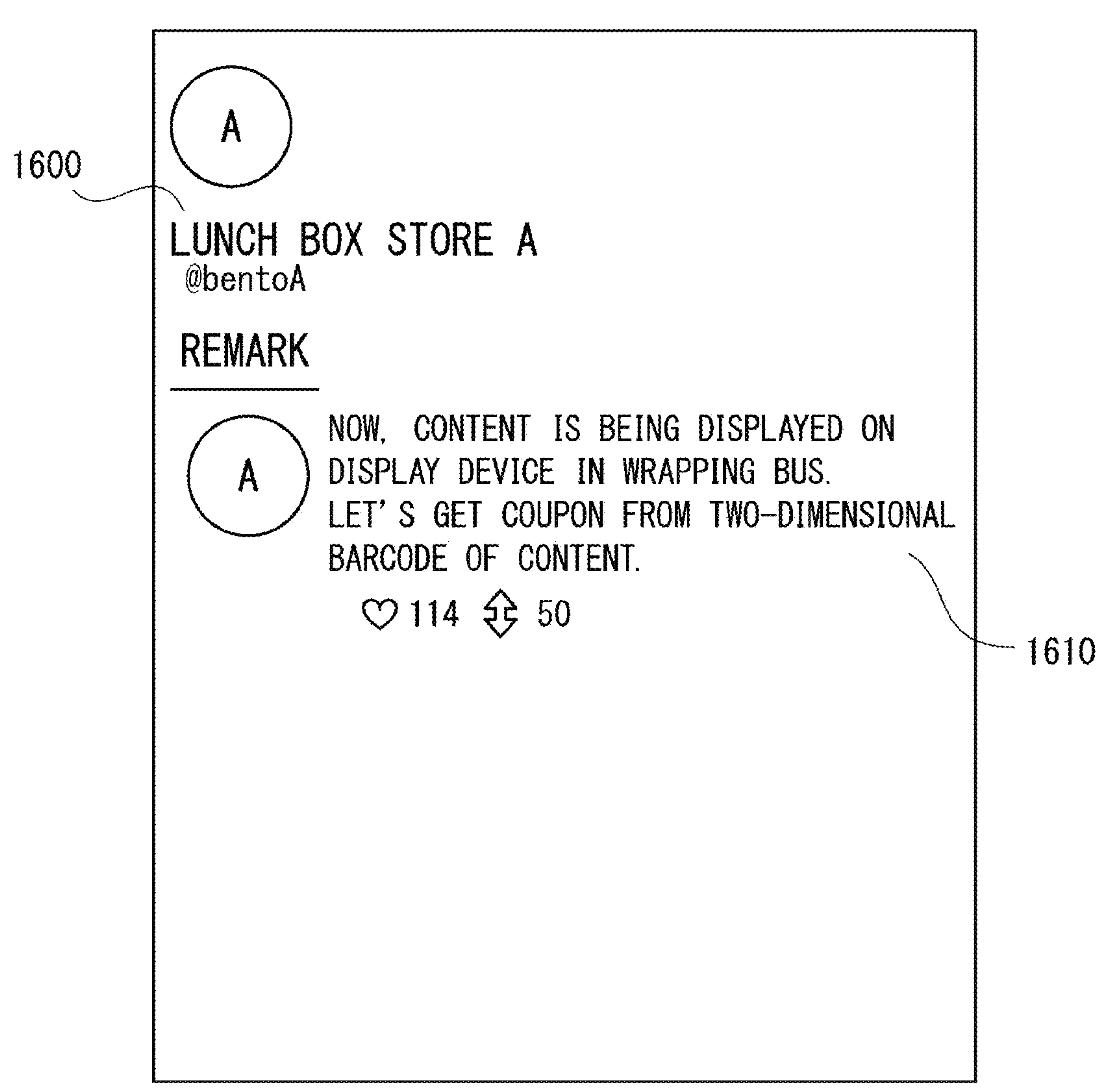
FIG. 16 is a diagram illustrating a screen example when posting data is displayed on a display screen of a terminal device 40*a*.

FIG. 16 is a diagram illustrating a screen example when posting data is displayed on a display screen of the terminal device 40*a*. On the display screen of posting data, a name of the SNS account and an icon are displayed (reference sign 1600), and a character string indicating details of the posting data is displayed (reference sign 1610). As details of the posting data, for example, a character string "Now, content is being displayed on a display device in a wrapping bus. Let's get a coupon from a two-dimensional barcode of the content." is displayed. When the posting data is published, a user of the terminal device 40 can view the content displayed on the display device Da provided in the vehicle Va by viewing the posting data. Here, a user located in the vicinity of the display device Da in the vehicle Va may view the displayed content without ascertaining the posting data using the terminal device 40 by ascertaining that content is displayed on the display device Da. The user can image the content and the identification number displayed on the display device Da using the terminal device 40.

Figure 17:
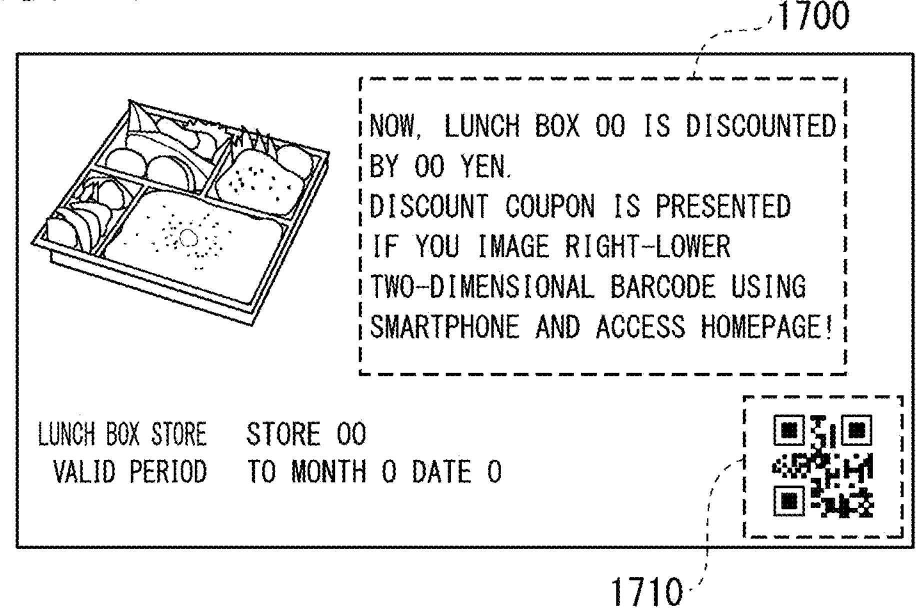
FIG. 17 is a diagram illustrating an example of content that is displayed on a display device Da.

FIG. 17 is a diagram illustrating an example of content that is displayed on the display device Da.

The content includes a message (reference sign 1700) and a two-dimensional barcode (reference sign 1710) indicating that an incentive is granted when a homepage is accessed by imaging the two-dimensional barcode displayed to overlap the content using the terminal device 40. A user in the vehicle Va can access an URL indicated by the two-dimensional barcode using the terminal device 40 by imaging at least the two-dimensional barcode included in the content by the camera function of the terminal device 40.

When the notification data has been received, the delivery server 12 changes the delivery status corresponding to the content number included in the notification data from "pre-delivery" to "in-delivery." Here, when there is other content of which a delivery status is "in-delivery," "in-delivery" is changed to "delivered," and the delivery status of the content to be currently displayed is changed from "pre-delivery" to "in-delivery." For example, when the vehicle Va passes through a target place of a content number "c1," content of "lunch box store A" is displayed. When the vehicle Va passes through a target place of a content number "c2," a delivery status of content "lunch box store A" which is other content is changed from "in-delivery" to "delivered," and a delivery status of content "local company B" with the content number "c2" displayed in this time is changed from "pre-delivery" to "in-delivery."

(Step S05*a*)

The delivery server 12*a* determines whether the vehicle Va has passed through all of a plurality of target places correlated with the vehicle number of the vehicle, continues to perform a monitoring process in Step S03*a* when a target place not passed through remains (Step S07*a*: NO), and ends the monitoring process for the vehicle Va when all the target places have been passed through (Step S07*a*: YES).

Figure 14:
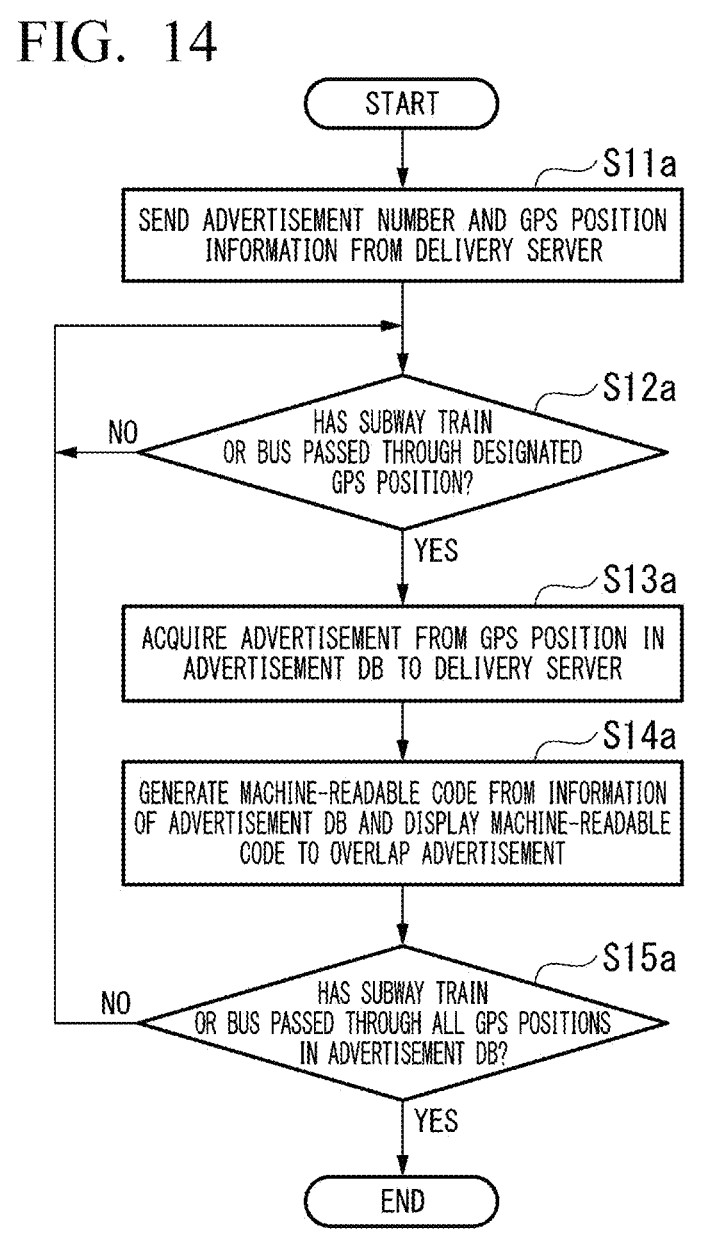

FIG. 14 is a flowchart illustrating a process flow that is performed by the delivery server 23*a* mounted in the vehicle Va.

(Step S11*a*)

When the vehicle Va arrives at a switchyard and stops, the delivery server 23*a* notifies the delivery server 12*a* of a vehicle number. Then, the delivery server 23*a* receives a content number, content, and a target place corresponding to the vehicle number from the delivery server 23.

(Step S12*a*)

The delivery server 23*a* acquires a current position of the vehicle Va from a positioning device of the vehicle Va whenever a predetermined time interval elapses and determines whether the current position has reached a target place.

When it is determined that the current position and the target place match (or when it is determined that the current position is within a predetermined range from the target place), the delivery server 23*a* causes the process flow to proceed to Step S13*a* (Step S12*a*: YES). On the other hand, when it is determined that the current position and the target place do not match (or when it is determined that the current position is not within a predetermined range from the target place), the delivery server 23*a* causes the process flow to proceed to Step S12*a* after a predetermined waiting time elapses (Step S12*a*: NO).

(Step S13*a*)

The delivery server 23*a* reads content stored in the advertisement database 22*a* and corresponding to a target place which the current position matches (or is within a predetermined range) from the advertisement database 22*a*.

(Step S14*a*)

When content is read, the code generating unit 232*a* of the delivery server 23*a* generates provision information including identification information corresponding to a current time and an URL as a machine-readable code. Then, the display control unit 231*a* of the delivery server 23*a* outputs the machine-readable code along with the read content to the display device Da via an image cable. Accordingly, the display device Da displays the machine-readable code indicating the identification information and the URL along with the content on the display screen. Here, the machine-readable code may be generated such that the machine-readable code includes a vehicle number and a content number in addition to the time data and the URL.

A user in the vehicle can image the content displayed on the display device Da by the camera function of the terminal device 40 carried by the user. Then, the terminal device 40 can extract the URL by analyzing the machine-readable code included in the captured image and access the management server 13 indicated by the URL. The user can acquire an incentive by accessing the URL. When this incentive is a web site published at the URL which is an access destination, the user can view the web site by accessing the URL and enjoy the incentive as a result. When the incentive is a coupon, the user can access a web site in which a screen available with the coupon is displayed by accessing the URL, receive the coupon, and enjoy the incentive as a result.

Here, since the URL includes the time data, the content number, and the vehicle number, the management server 13 can ascertain whether the user has viewed the content at a time at which the content has been displayed on the basis of the URL accessed by the terminal device 40.

(Step S15*a*)

The delivery server 23*a* determines whether the vehicle has passed through all of a plurality of target places stored in the advertisement database 22*a*, continues to perform a monitoring process in Step S12*a* when a target place not passed through remains (Step S15*a*: NO), and ends the monitoring process for the vehicle Va when all the target places have been passed through (Step S15*a*: YES).

Figure 15:
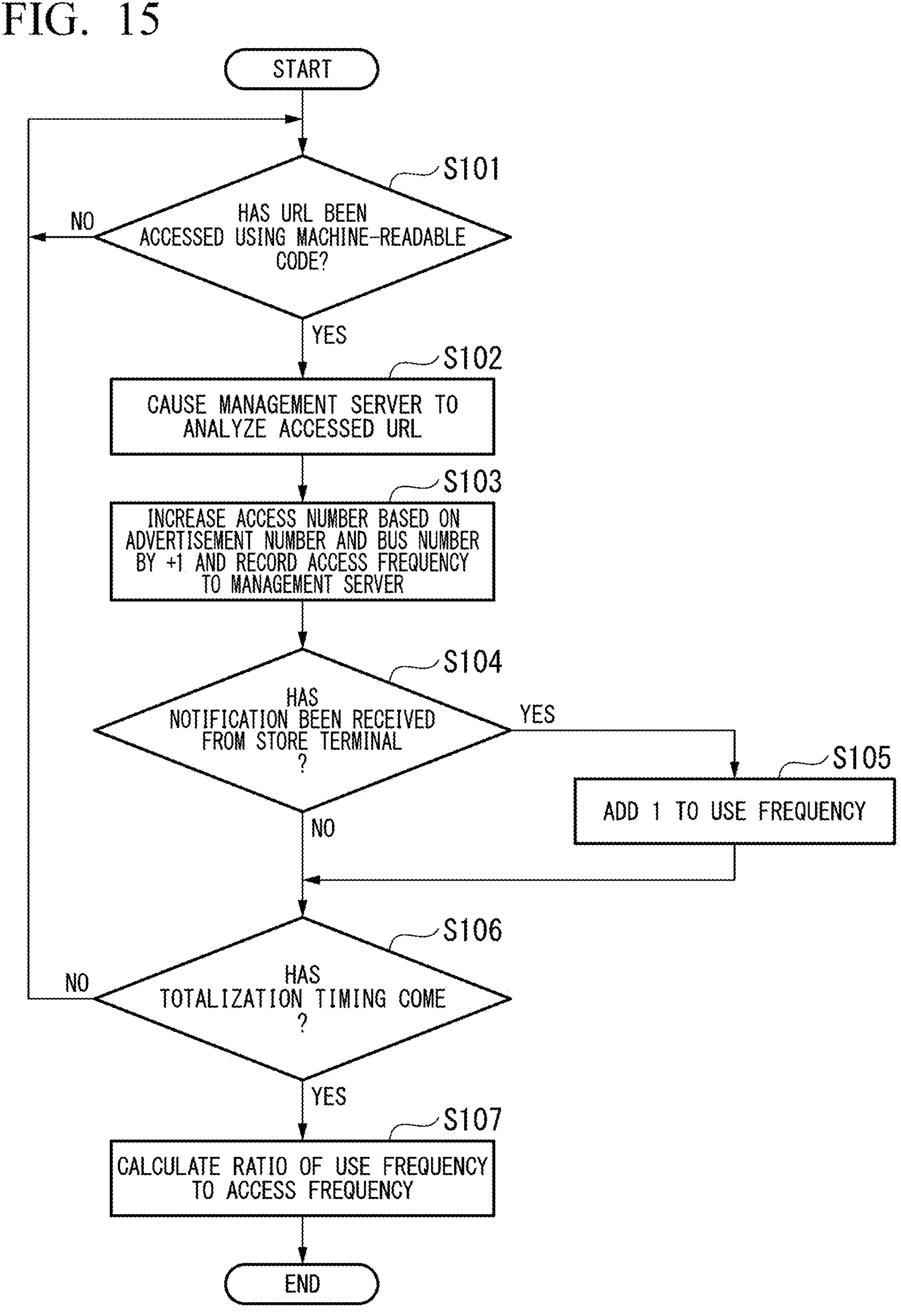
FIG. 15 is a flowchart illustrating a process flow that is performed by a management server 13*a*.

FIG. 15 is a flowchart illustrating a process flow that is performed by the management server 13*a*.

(Step S101)

The management server 13*a* determines whether an access to an URL using a two-dimensional barcode has been performed by the terminal device 40.

When an access to the URL has not been performed, the management server 13*a* performs the process of Step S101 again after a predetermined waiting time elapses. On the other hand, when an access to the URL has been performed, the management server 13*a* causes the process flow to proceed to Step S102.

(Step S102)

The management server 13*a* analyzes the URL accessed by the terminal device 40.

An example of the accessed URL is the following character string.

https://xxx.b1.1.20210827.1200

In this character string, a character string "xxx" represents an address of the management server 13*a*, "b1" represents a vehicle number, "1" represents a content number, "20210827" represents a date on which the content has been displayed, and "1200" represents a time at which the content has been displayed.

The acquisition unit 131*a* of the management server 13*a* acquires such information by analyzing the URL accessed by the terminal device 40 and extracting the vehicle number, the content number, the display date, and the display time.

(Step S103)

The totalization unit 132*a* of the management server 13*a* performs count-up by adding "1" to the access frequency corresponding to the advertisement number and the vehicle number on the basis of the extraction result. Here, when time data corresponding to the advertisement number and the vehicle number is not written, time data is written. It is possible to ascertain a time at which the content has been actually displayed on the display device Da by writing the time data.

(Step S104)

The delivery server 23 determines whether a notification indicating that an incentive has been used has been received from the store terminal 50. The delivery server 23 causes the process flow to proceed to Step S105 when a notification indicating that an incentive has been used has been received from the store terminal 50 and causes the process flow to proceed to Step S106 when a notification indicating that an incentive has been used has not been received from the store terminal 50.

(Step S105)

The totalization unit 132*a* of the delivery server 23 performs count-up by adding "1" to the user frequency corresponding to the advertisement number and the vehicle number included in the notification in response to reception of the notification from the store terminal 50. Thereafter, the management server 13*a* causes the process flow to proceed to Step S106.

(Step S106)

The totalization unit 132*a* of the management server 13*a* determines whether a totalization timing has come, causes the process flow to proceed to Step S101 when the totalization timing has not come, and causes the process flow to proceed to Step S107 when the totalization timing has come.

(Step S107)

The totalization unit 132*a* of the management server 13*a* reads an access frequency and a use frequency from the measurement data table and calculates a ratio of the user frequency to the access frequency (a ratio of use). The management server 13*a* transmits the calculated ratio to a terminal device of an advertisement consignor corresponding to the advertisement number. Accordingly, the advertisement consignor can ascertain an effect of displaying of content on the basis of the ratio of use indicating how the distributed incentive has been actually used.

The management server 13*a* may transmit the time data, the access frequency, and the use frequency in the measurement data table to the terminal device of the advertisement consignor corresponding to the advertisement number. Accordingly, since an effect of displaying of content can be ascertained on the basis of the number of times the URL has been accessed and the time at which the content has been displayed, it is possible to estimate an effect of displaying of content in consideration of the timing at which the content has been displayed.

Accordingly, it is possible to estimate an effect of displaying of content in consideration of the timing at which the content has been displayed. For example, when content associated with lunch is displayed, it is possible to ascertain that the effect can be enhanced when which of a timing before a lunch time period and a timing in the lunch time period the time displayed on the display device is in consideration of a relationship with the delivered target place.

Figure 18:
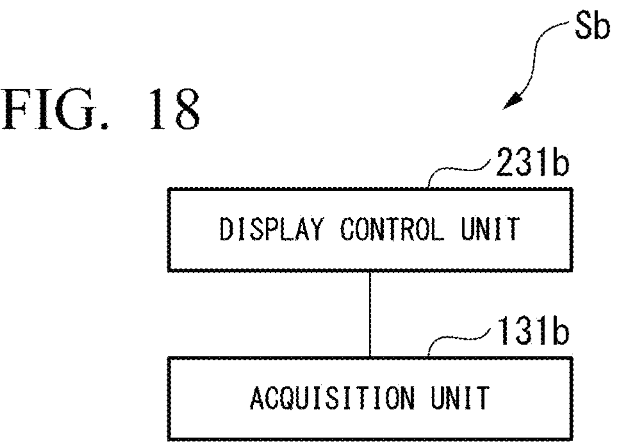
FIG. 18 is a functional block diagram schematically illustrating a configuration of a display system according to a third embodiment.

FIG. 18 is a functional block diagram schematically illustrating a configuration of a display system according to a third embodiment.

A display system Sb includes a display control unit 231*b* and an acquisition unit 131*b*.

When a vehicle arrives at a target place, the display control unit 231*b* displays content corresponding to the target place along with identification information including information for identifying a time at which the content has been displayed on one or more display units on the vehicle. The display unit may be provided outside of the vehicle. In this case, the content displayed on the display unit can be seen by a user outside of the vehicle. The display unit may be provided in the vehicle. In this case, the content displayed on the display unit can be seen by a user in the vehicle.

When identification information has been acquired by a terminal device of a user having viewed the content displayed on the display unit, the acquisition unit 131*b* acquires identification information when an action using the identification information has been performed by the user. Acquisition of the identification information by the terminal device of the user may be performed by imaging the content along with the identification information displayed on the display unit using the camera function of the terminal device carried by the user. Acquisition of a user's action using the identification information may be performed through posting of an image including identification information imaged by the terminal device of the user in the form of retweet or sharing of an account of an advertisement consignor in the SNS or inputting of identification information from a terminal device in a store in response to presentation of identification information at the time of purchase of a product or provision of a service in the store. Accordingly, it is possible to ascertain an effect of displaying of content in consideration of the timing at which the content has been displayed.

Figure 19:
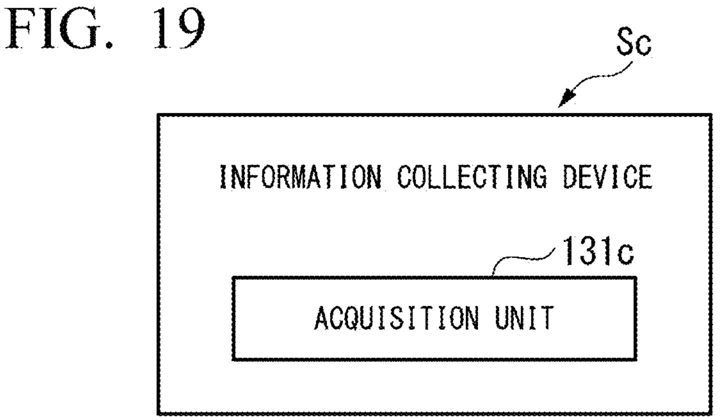
FIG. 19 is a block diagram schematically illustrating a configuration of an information collecting device Sc according to another embodiment.

FIG. 19 is a block diagram schematically illustrating a configuration of an information collecting device Sc according to another embodiment.

The information collecting device Sc includes an acquisition unit 131*c*.

The acquisition unit 131*c* displays content based on a position of a vehicle along with identification information including information for identifying at least one of a time at which content has been displayed and a position at which the content has been displayed and provision information including connection destination information of the content on one or more display units on the vehicle on the basis of at least one of a target place at which the vehicle has arrived and a current time, and acquires at least one of the time at which the content has been displayed and the position at which the content has been displayed based on the identification information from a terminal device having accessed an access destination indicated by the connection destination information after the provision information displayed on the display unit has been acquired using the terminal device.

In the aforementioned embodiments, the advertisement database 11, the advertisement database 11*a*, the advertisement database 22, the advertisement database 22*a*, and the storage unit 133*a* may be constituted by a storage medium such as a hard disk drive (HDD), a flash memory, an electrically erasable programmable read only memory (EEPROM), a random access read/write memory (RAM), a read only memory (ROM), or an arbitrary combination of the storage media. The advertisement database 11, the advertisement database 11*a*, the advertisement database 22, the advertisement database 22*a*, and the storage unit 133*a* may employ, for example, a nonvolatile memory.

The posting unit 121, the posting unit 121*a*, the acquisition unit 131*a*, the acquisition unit 131*b*, the acquisition unit 131*c*, the totalization unit 132*a*, the image data receiving unit 134*a*, the issuing unit 135*a*, the display control unit 231, the display control unit 231*a*, the display control unit 231*b*, the code generating unit 232, and the code generating unit 232*a* may be constituted, for example, by a processor such as a central processing unit (CPU) or a dedicated electronic circuit.

In the aforementioned embodiments, there are a plurality of types of content, but the number types of content may be one. In this case, since there is only one piece of content, it is possible to identify content without using a content number. Accordingly, identification information may not include a content number.

According to the aforementioned embodiments, it is possible to ascertain an advertisement effect in a system for displaying content on a display device provided on a vehicle and updating and displaying the content according to a current position of the vehicle.

Construction management may be performed by recording programs for realizing the functions of the delivery server 12, the management server 13, and the delivery server 23 illustrated in FIG. 2, the functions of the delivery server 12*a*, the management server 13*a*, and the delivery server 23*a* illustrated in FIG. 9, and the functions of the display control unit 231*b* and the acquisition unit 131*b* illustrated in FIG. 18 on a computer-readable recording medium and causing a computer system to read and execute the programs recorded on the recording medium. The "computer system" mentioned herein includes an OS or hardware such as peripherals.

The "computer system" includes a homepage provision environment (or display environment) when a WWW system is used.

The "computer-readable recording medium" means a portable medium such as a flexible disk, a magneto-optical disc, a ROM, or a CD-ROM or a storage device such as a hard disk incorporated into the computer system. The "computer-readable recording medium" includes a medium that holds a program for a predetermined time such as a volatile memory in a computer system serving as a server or a client. The program may be for realizing some of the aforementioned functions or may be for realizing the aforementioned functions in combination with a program stored in advance in the computer system. The program may be stored in a predetermined server, and the program may be delivered (downloaded or the like) via a communication line in response to a request from another device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

10, 10*a* Switchyard system
11, 11*a* Advertisement database
12, 12*a* Delivery server
13, 13*a* Management server
20, 20*a* Vehicle system
21, 21*a* Communication unit
22, 22*a* Advertisement database
23, 23*a* Delivery server
30 SNS server
40, 40*a*, 40*b*, 40*c*, 40*d* Terminal device
50 Store terminal
121, 121*a* Posting unit
131, 131*a*, 131*b* Acquisition unit
132, 132*a* Totalization unit
133, 133*a* Storage unit
134*a* Image data receiving unit
135*a* Issuing unit
231, 231*a*, 231*b* Display control unit
232, 232*a* Code generating unit
1344*a* Image data receiving unit

What is claimed is:

1. A display system comprising:
a vehicle system; and
a switchyard system communicatively connected to the vehicle system,
wherein the switchyard system comprises a first delivery server and a management server,
the switchyard system is communicatively connected to at least a store terminal;
the vehicle system comprises a display device for displaying contents and a second delivery server,
the display device is provided in a vehicle
the second delivery server is mounted in the vehicle,
the second delivery server is configured to acquire position data from a positioning device mounted in the vehicle, where the position data having been obtained by the positioning device by measuring a current position of the vehicle;
the second delivery server is configured to have an access to an advertisement database;
the second delivery server is configured to determine whether the position data corresponds to a target place stored in the advertisement database,
the second delivery server is configured to read a content out of the advertisement database, where the content is of an advertisement number that is correlated with the target place, if the second delivery server determined that the position data corresponds to the target place,
the second delivery server is configured to transmit, to the first delivery server, notification data on a basis of a vehicle number which is stored in advance;
the notification data includes a content number of the content as read and the current position determined to correspond to the target place;
the second delivery server is configured to cause the display device on the vehicle to display content based on the position of the vehicle along with identification information identifying at least one of a time at which the content has been displayed and a position at which the content has been displayed;

the management server is configured to determine whether a reaction of adding image data has been performed in response to posting data for prompting content to be imaged in an account of an advertisement consignor;

the management server is configured to acquire time data of a time at which the content has been displayed, by analyzing identification information included in image data used for the reaction;

the management server is configured to determine whether a time indicated by the identification information included in the image data as added corresponds to an imaging time as added to the image data, the management server is configured to determine whether the image data as added corresponds to the content, on a basis of the determination of whether the time indicated by the identification information corresponds to the imaging time;

the management server is configured to grant an incentive to a terminal device of a user, who has performed the reaction, by transmitting the incentive to the terminal device if the image as added corresponds to the content;

the first delivery server is configured to receive the notification data including the content number from the second delivery server, and the first delivery server is configured to transmit the posting data to an SNS server, the posting data indicating that the vehicle has passed through the target place, to cause the SNS server to publish the posting data in an SNS site and to allow the posting data to be viewable by the terminal device.

2. The display system according to claim 1, wherein the display device is provided on an outer surface of the vehicle such that the content is visible from outside of the vehicle, and wherein the identification information is acquired by a terminal device of a user who is not in the vehicle.

3. The display system according to claim 1, wherein the management server is configured to calculate a ratio between a number of incentives issued in response to an access based on a URL and a number of pieces of identification information acquired from the terminal device of the store in response to use of incentives.

4. The display system according to claim 1, wherein the second delivery server is configured to generate a machine-readable code indicating identification information when the content is displayed; and wherein the display device displays the machine-readable code along with the content.

* * * * *